Jan. 16, 1940.  C. R. NEESON  2,187,712
INTERNAL COMBUSTION ENGINE DRIVE FOR COMPRESSORS
Filed Jan. 3, 1938
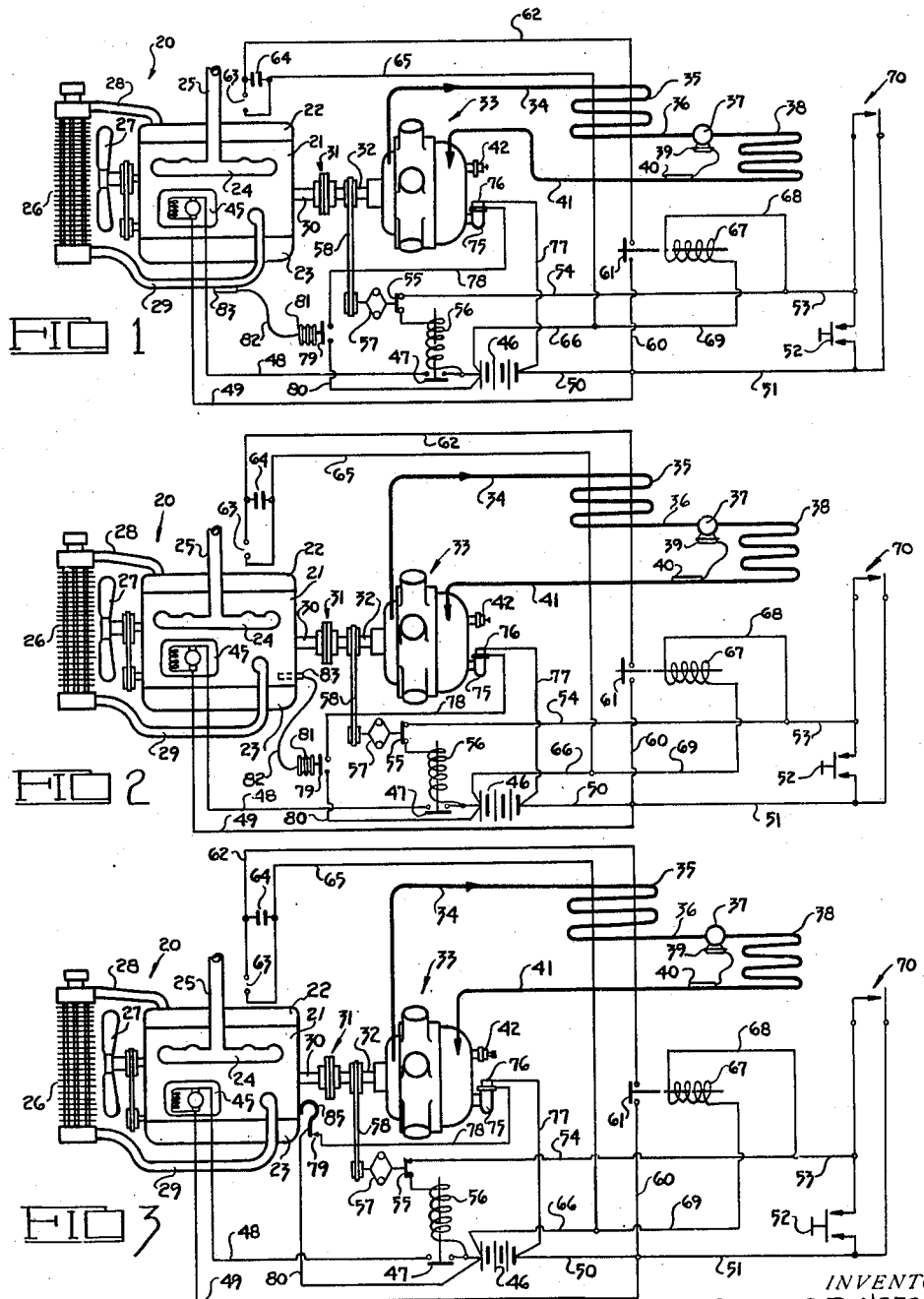
INVENTOR
CHARLES R. NEESON
BY Harness, Dind, Patee & Harris
ATTORNEY Patented Jan. 16, 1940

2,187,712

UNITED STATES PATENT OFFICE 2,187,712

INTERNAL COMBUSTION ENGINE DRIVE FOR COMPRESSORS

Charles R. Neeson, Dayton, Ohio, assignor, by mesne assignments, to Chrysler Corporation, Highland Park, Mich., a corporation of Delaware Application January 3, 1938, Serial No. 182,937

1 Claim. (Cl. 62—3)

My present invention relates to apparatus for operating a compressor, particularly a compressor for use in refrigerating or air conditioning systems. My invention is of specific application to a compressor such as more fully set forth in the co-pending applications of Charles R. Neeson, Serial No. 177,694, filed December 2, 1937, now Patent No. 2,185,473, January 2, 1940, and Charles R. Neeson and Frank B. Conlon, Serial No. 177,695, filed December 2, 1937, now Patent No. 2,173,285, September 19, 1939, the said compressor comprising a plurality of cylinders and means whereby the number of cylinders in operation may be varied in order to vary the capacity of the compressor in accordance with the load thereon, and being also provided with a solenoid valve or other means completely to unload the compressor when desired.

The object of the present invention is to provide means whereby commodity refrigerating mechanism or air conditioning refrigerating mechanism may be powered by an internal combustion engine of any suitable type fueled by gasoline, natural gas or other combustible hydrocarbons. It is well known that such engines cannot be placed under full load when starting cold since doing so usually "kills" the engine. Accordingly, internal combustion engines are connected to the driven machinery through the medium of a clutch or other similar device, such as the clutch and transmission of an automobile, in order that the engine may be permitted to become heated before placing a load thereon. This is particularly true with respect to certain types of engines which are not provided with expensive and complicated quick-heating devices. The primary object of my invention is to enable the use of the simplest form of internal combustion engine by permitting the same to warm to a considerable extent before becoming loaded, at the same time eliminating other expensive apparatus by directly connecting the crank shaft of the compressor to the crank shaft of the engine.

Another object of the present invention is to provide means whereby the above-mentioned combination of engine and compressor may be automatically controlled, the control means acting first to start the engine through the medium of any ordinary type of starting mechanism, then to deenergize the starting mechanism as soon as the engine has started, then to load the compressor as soon as the engine has become sufficiently warm.

The objects and advantages of the present invention will be more fully apparent from a study of the following specification taken in connection with the accompanying drawing wherein Fig. 1 sets forth a preferred form of the invention; Fig. 2 sets forth a slightly modified form of the invention; and Fig. 3 sets forth a further modification of the invention.

Throughout the various figures the same reference numerals are applied to like parts whenever possible. The drawing discloses an internal combustion engine 20 consisting of a cylinder block 21 provided with the usual cylinder head 22 and oil pan 23. An exhaust manifold 24 is indicated as being connected to an exhaust pipe 25 which leads to any suitable outlet for the exhaust gases. The engine is shown as a water-cooled type provided with a cooling radiator 26 through which air is drawn or blown by a fan 27 and which is provided with suitable connections 28 and 29 whereby the water is permitted to circulate through the waterjacket around the cylinders 20 and through the radiator in order to extract heat from the cylinder walls and reject the same into the radiator cooling air. The engine may be air-cooled if desired, the water-cooled type being shown since the same is more common.

The engine is provided with a crank shaft 30 which is connected by means of a coupling 31 with the crank shaft 32 of a compressor 33, said compressor being of a variable capacity type provided with individual cylinder unloading means 30 and complete unloading means as detailed and claimed in the aforesaid applications. The compressor is connected to a discharge pipe 34 leading compressed refrigerant into a condenser 35 from which the condensed refrigerant passes into a liquid line 36. A variable orifice expansion valve 37 is usually provided in such systems to permit the expansion of refrigerant into an evaporator 38 under control of a valve motor 39 set in a variable manner by the expansion of a thermostatic fluid in a bulb 40 placed in heat transferring relation to the suction pipe 41 which leads the expanded refrigerant back to the compressor. The expansion of the fluid in bulb 40 is controlled by the superheat of the expanded gas in suction pipe 41 which in turn is controlled by the load upon the evaporator 38. Of course, other types of refrigerating systems may be substituted for the simple type schematically disclosed herein for the purpose of illustrating the combination. The expanded refrigerant enters the crank case of the compressor and is recompressed in the cylinders to again traverse the refrigerating system. An individual cylinder unloading control device 42 is schematically set forth, the same comprising means to sense the pressure of the expanded gas in order to control the number of cylinders in operation, as set forth in the aforesaid applications. By means of the control device 42, as long as any cooling is desired, the compressor will operate at a variable capacity directly responding to the superheat and pressure of the gas which is a measure of the load on the system.

The engine is preferably provided with the ordinary starting motor 45 comprising a shunt machine which is connected to a battery 46 through switch 47, wire 48 and wires 49 and 50 leading back to battery. When the switch 47 is closed, the starting motor will be energized to operate the pistons of the engine prior to the operation thereof by the forces of internal combustion. In order to start the engine the switch 47 may be closed by the completion of a circuit from battery 46 through wire 50, wire 51, starting button 52, wire 53, wire 54, speed switch 55 and solenoid 56, back to battery. The armature of solenoid 56 is connected to switch 47 in order to close the same whenever the starting button is depressed. The speed switch 55 is normally closed since the same is connected to a centrifugal device 57 driven by a belt 58 passing about a pulley on the crank shaft 32. In order to complete an ignition circuit, which includes wire 50, wire 60, ignition switch 61, wire 62, spark gap 63, across which is placed the condenser 64, wire 65 and wire 66 to the battery, there is provided a solenoid 67 placed in parallel with solenoid 56 so that when the starter button 52 is depressed a circuit will be completed from wire 50 through wire 51, starter button 52, wire 53, wire 68, solenoid 67, wire 69 and wire 66 back to battery, which closes the ignition switch 61 and permits the application of ignition current to the spark plugs or other igniting mechanism for the internal combustion engine. It can be seen that the depression of button 52 causes the starting motor to be energized and the fuel to be ignited, which usually causes the engine to run under its own power. As soon as the engine has picked up a speed greater than can be imparted thereto by the motor 45, the centrifugal switch 55 will open thereby deenergizing solenoid 56 and breaking the starting motor circuit. The ignition switch 61, however, will be held closed by the parallel circuit through the starter button.

A thermostat 70 is indicated as being positioned near the evaporator 38, the same being usually provided in the enclosure, ice-box or other area being refrigerated by the refrigerating mechanism. The thermostat 70 is in parallel with the starting button 52 so that, while the engine may be started manually, it is apparent that the circuit includes an automatic starting switch under control of the temperature of the area or medium being refrigerated by the combination. When the thermostat 70 indicates that cooling is desired the circuit will be closed to the starting motor and the igniting means, and as soon as the engine is running under its own power the starting motor will be deenergized while the thermostat continues to close the ignition circuit. As soon as the cooling has progressed to a desired point, the thermostat 70 will open thereby deenergizing solenoid 67 and breaking the ignition circuit so that the machine comes to a rest.

An ordinary compressor could not be placed in the present combination since the immediate application of full load on the crank shaft would stall the engine. The type of compressor herein set forth not only comprises the individual cylinder unloading means under control of the controller 42, but also comprises a means whereby the compressor may be held completely unloaded, the latter means comprising a solenoid valve 75 under control of a solenoid motor 76. The motor 76 is placed in a circuit comprising battery 46, wire 77, wire 78, loading switch 79 and wire 80 back to battery. The loading switch in Fig. 1 is controlled by an expansible bellows 81 connected by a tube 82 to a bulb 83, filled with an expansible fluid, which is placed in heat-transferring relationship with the water circulating pipe 29. Switch 79 is normally held open by the contraction of bellows 81 but will be closed when the water in the cooling system has become heated to a sufficient extent. Proper adjustment can be made so that the cooling water must have risen in temperature a sufficient number of degrees to indicate that the engine is capable of continuing to run under full load. As soon as this happens, switch 79 closes, energizing the solenoid motor 76 to open solenoid valve 75 which permits the complete loading of the compressor as set forth in the aforesaid applications. The pistons of the compressor, which are connected to the compressor crank shaft, reciprocate whenever the engine crank shaft is turning, but the unloading mechanism prevents the compression of gas thereby until valve 75 is opened. When valve 75 is open, the compressor will compress gas, at first by all cylinders due to the high suction pressure existing within the refrigerating system, and later by a variable number of cylinders under control of the superheat and pressure of the expanded refrigerant. The engine is thereby permitted to come to an efficient operating condition before being placed under a load. As previously explained, the engine will continue to run until thermostat 70 opens.

Fig. 2 is the same as Fig. 1 in all details except that bulb 83 is immersed in the waterjacket of the cylinder block so as to be more directly affected by the temperature of the cooling water. The operation and construction of all other parts of the system are identical.

Fig. 3 is also the same as Fig. 2 except that switch 79 preferably comprises a bi-metallic contact member 85 mounted upon the side of the engine block so as to be affected by heat transferred thereto through direct contact, through radiation from the cylinder block, and through convection about the cylinder block. This type of unloading switch would have its greatest application with respect to air cooled engines, but obviously, the water-cooled engine may be provided with the bi-metallic strip 85.

While the invention has been disclosed as combining a compressor with an ordinary internal combustion engine, it should be readily apparent that other types of engines such as the Diesel engine may be so utilized, in which case the starting motor may be replaced by the conventional compressed-air-driven starting mechanism under control of the starter button or thermostat, and the spark plugs may be replaced by a control valve in the fuel line also under control of the starter button or thermostat. Other details of modern power plants may be incorporated in the main combination since any person skilled in the art may readily appreciate the value thereof. Various features which may be added are the starting motor protector device which prevents continued running of the starter motor if ignition fails to take place, the repeating starter such as "The Bendix Startix" which causes the starting motor to operate several times at spaced intervals, and various types of safety devices commonly used in automobiles and other mechanism using internal combustion engines. It should be appreciated, however, that the present disclosure sets forth all that is necessary for an operative combination embodying the basic principles of my invention.

Having described several modifications of the preferred form of my invention, it should be apparent to those skilled in the art that modification in arrangement and details thereof may be devised which will come within the scope of the following claim. It should also be apparent that the engine and compressor may be "directly connected" in other ways than as shown, as distinguished from an indirectly connected combination comprising a clutch or other similar device.

I claim:

The combination of an internal combustion engine having an engine crank shaft with a compressor having a compressor crank shaft directly connected to the engine crank shaft, means to control the operation of said compressor whenever the temperature of the engine is below a predetermined minimum value comprising unloading mechanism for preventing the compression of gas by said compressor, and thermostatically controlled means for rendering said unloading means inoperative and thereby loading said compressor when the temperature of the engine rises above said minimum value.

CHARLES R. NEESON.